(No Model.)

J. B. HOLSTEN.
FLOATING POT.

No. 482,638. Patented Sept. 13, 1892.

WITNESSES:
William Miller
Edward Wolff

INVENTOR:
John B. Holsten.
BY
Van Santwoord & Hauff
ATTORNEYS.

UNITED STATES PATENT OFFICE.

JOHN B. HOLSTEN, OF NEW YORK, N. Y.

FLOATING POT.

SPECIFICATION forming part of Letters Patent No. 482,638, dated September 13, 1892.

Application filed March 26, 1892. Serial No. 426,590. (No model.)

*To all whom it may concern:*

Be it known that I, JOHN B. HOLSTEN, a citizen of the United States, residing at New York, in the county and State of New York, have invented new and useful Improvements in Floating Pots, of which the following is a specification.

This invention relates to improvements in floating pots, and by means of it the operation of soldering cans can be rapidly and accurately carried on, as set forth in the following specification and claims and illustrated in the annexed drawings, in which—

Figure 1:
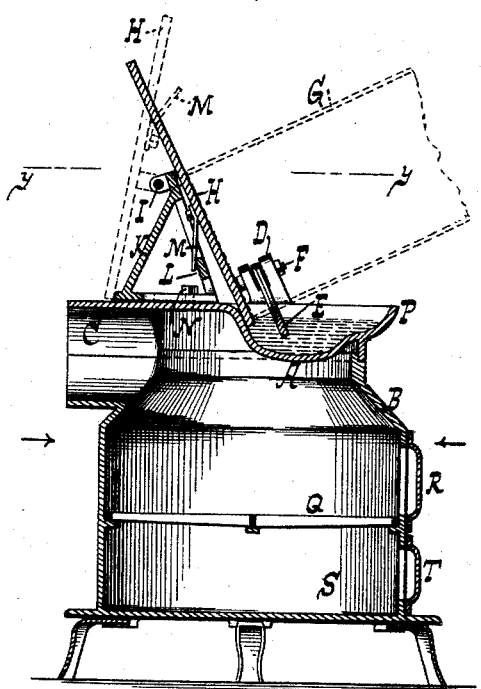
Figure 2:
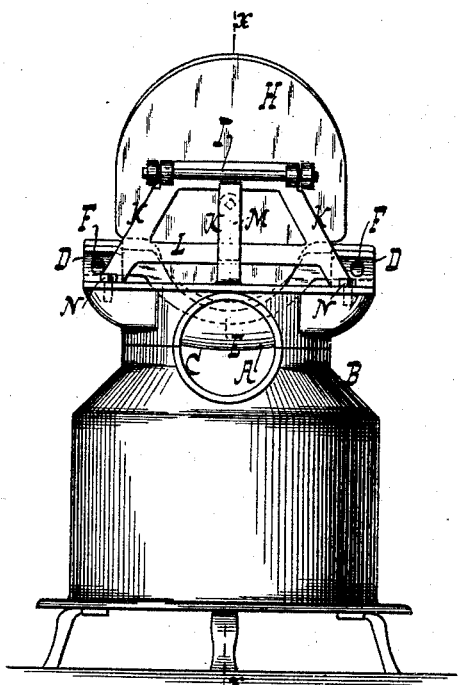
Figure 3:
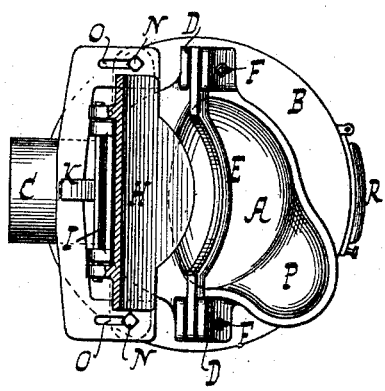
Figure 4:
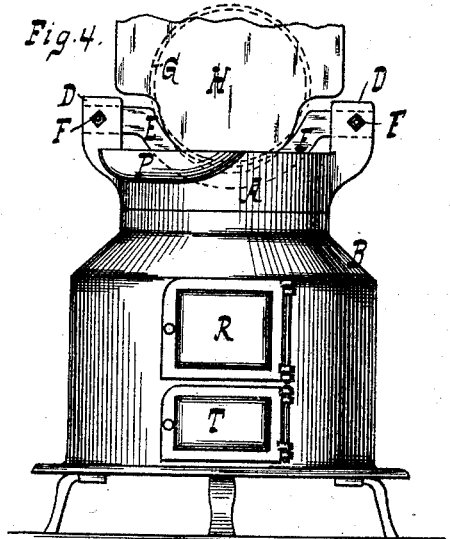

Figure 1 is a section of the pot along $xx$, Fig. 2. Fig. 2 is a rear elevation of the pot. Fig. 3 is a section along $yy$, Fig. 1. Fig. 4 is a front elevation of Fig. 1.

In the drawings the letter A indicates the pot resting on a suitable chamber or support B, so that heat can be readily applied to the pot to melt the solder therein. The heat or products of combustion pass off through chimney or escape C.

The pot is provided with upwardly-projecting standards or supports D, to which are secured by screws or other fastening devices F the ends of a guide-bar E, which is curved into segmental form between the standards and dips into the solder in the pot in such manner that a can G can be supported and rotated on the segmental or curved portion of the guide-bar for the purpose of applying solder thereto. The correct position of can G on guide E is secured by resting or bracing the can against a gage H, as seen in Fig. 1. This gage H consists of a plate or rest swinging on pivot or joint I, connecting the gage to a support or bracket K. The bracket has a cross-bar L, engaged by a suitable lock or latch M on gage H. When the lock is opened or swung aside to clear the bar L, the gage H can be swung out of the way, as seen by dotted lines in Fig. 1, so that the pot A can be readily cleared of any crust or accumulation that may have settled therein behind the gage. The gage should be adjustable toward and from guide E, so that it can be adjusted to have the can or article G properly operated on. By connecting the bracket or support K to the pot by means of a pin-and-slot connection N O such adjustability of the gage is secured.

The pot A has a feeding or drop spout P. In case fresh or cold solder is to be supplied, it is dropped onto spout P, and as it melts it gradually runs into pot A, the spout P being properly inclined for this purpose. Such fresh solder will then be thoroughly heated or fused by the time it reaches the guide or rest E and the solder at such guide or rest will not be chilled, as might be the case if a lump of cold solder were dropped directly into the pot.

The chamber B may have any suitable heat-supply for the pot A. In the drawings is shown a grate Q and furnace-door R, with ash-pit S and door T; but any suitable form of stove or heating apparatus will answer.

What I claim as new, and desire to secure by Letters Patent, is—

1. The combination of a floating pot having upwardly-projecting standards or supports D, a guide-bar E, having its ends secured to the standards or supports, a bracket K, adjustable on the pot toward and from the guide-bar, and an inclined gage H, pivoted to the bracket and provided with a catch M for engaging a part of the bracket to hold the gage in a fixed position, substantially as described.

2. The combination of a floating pot having upwardly-projecting standards or supports D, a guide-bar E, having its ends secured to the standards or supports, a bracket K, adjustable on the pot toward and from the guide-bar and provided with a cross-piece L, and an inclined gage H, pivoted to the bracket and provided with a catch M for engaging the cross-piece of the bracket, substantially as described.

In testimony whereof I have hereunto set my hand in the presence of two subscribing witnesses.

JOHN B. HOLSTEN.

Witnesses:
 WM. C. HAUFF,
 E. F. KASTENHUBER.